United States Patent [19]

Kimberley

[11] Patent Number: 5,056,469
[45] Date of Patent: Oct. 15, 1991

[54] FUEL INJECTION SYSTEM

[75] Inventor: John A. Kimberley, East Granby, Conn.

[73] Assignees: AIL Corporation, Columbia, S.C.;

[21] Appl. No.: 546,506

[22] Filed: Jun. 29, 1990

[51] Int. Cl.[5] .............................................. F02D 19/04
[52] U.S. Cl. ...................................... 123/23; 123/446
[58] Field of Search .................. 123/23, 299, 300, 384, 123/575, 446, 294; 251/57

[56] References Cited

U.S. PATENT DOCUMENTS

| 1,216,403 | 2/1917 | Bertsch | 123/23 |
| 4,052,963 | 10/1977 | Steiger | 123/23 |
| 4,335,684 | 6/1982 | Davis | 123/23 |
| 4,558,664 | 12/1985 | Robben | 123/23 |
| 4,662,315 | 5/1987 | Sommer | 123/23 |

Primary Examiner—Noah P. Kamen
Attorney, Agent, or Firm—Richard D. Weber; Richard D. Weber

[57] ABSTRACT

A fuel injection system for alternate fuels such as coal-water slurry comprises a conventional fuel injection pump for supplying timed and metered pulses of diesel fuel to an injector assembly. The injector assembly includes a shuttle piston in a cylinder which is connected at one end by an injection line to the pump and at the other end by a passage to an injection nozzle. The alternate fuel is introduced into the injector assembly passage under pressure through a check valve between injection intervals. A bleed passage in the pump delivery valve provides a rapid pressure decay in the injection line following injection, permitting the shuttle piston to return to its starting position under the influence of the alternate fuel pressure. The timed and metered injection pulses are transferred by the shuttle piston from the diesel fuel to the alternate fuel to open the injection nozzle and inject the alternate fuel into an engine cylinder.

6 Claims, 3 Drawing Sheets

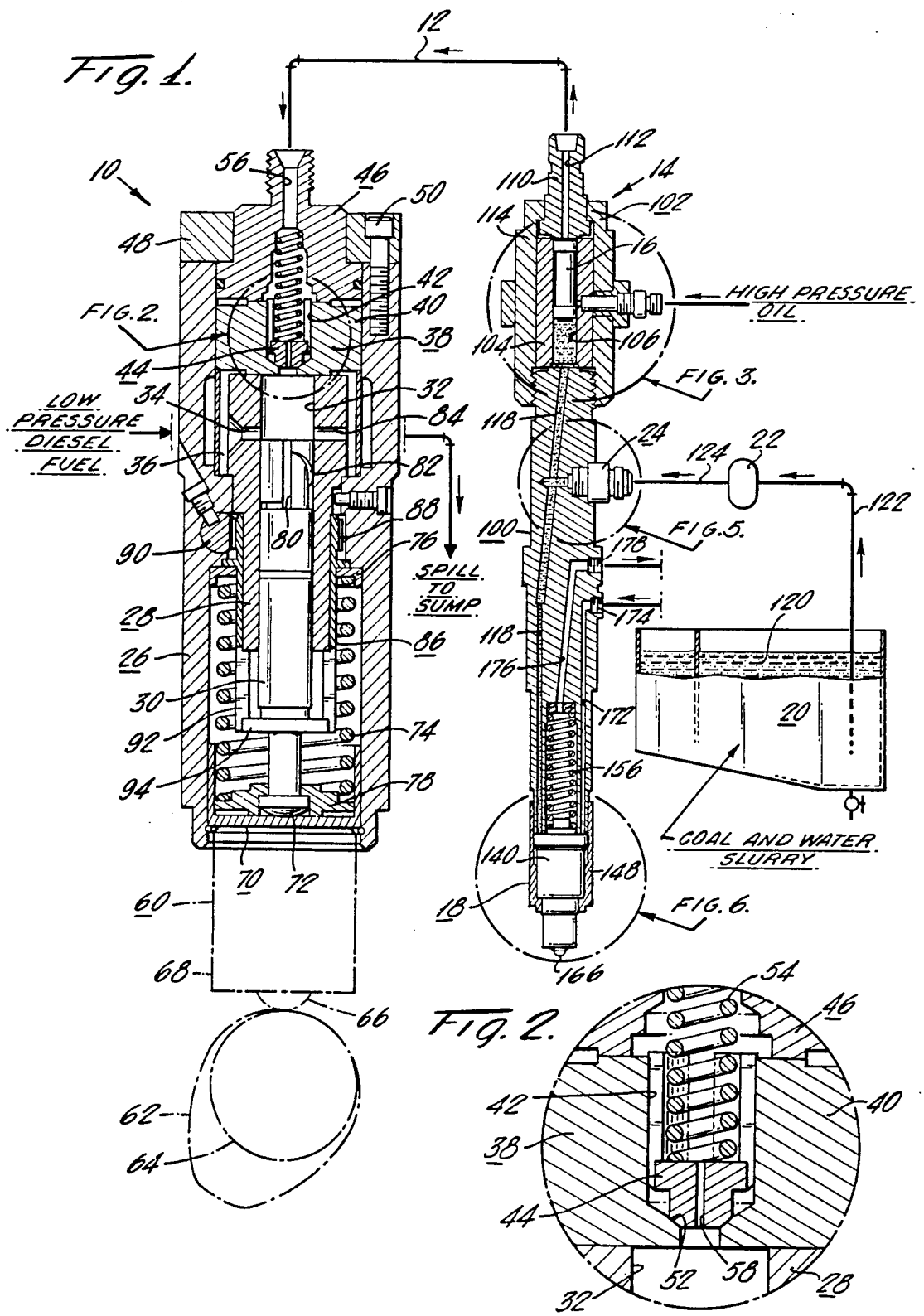

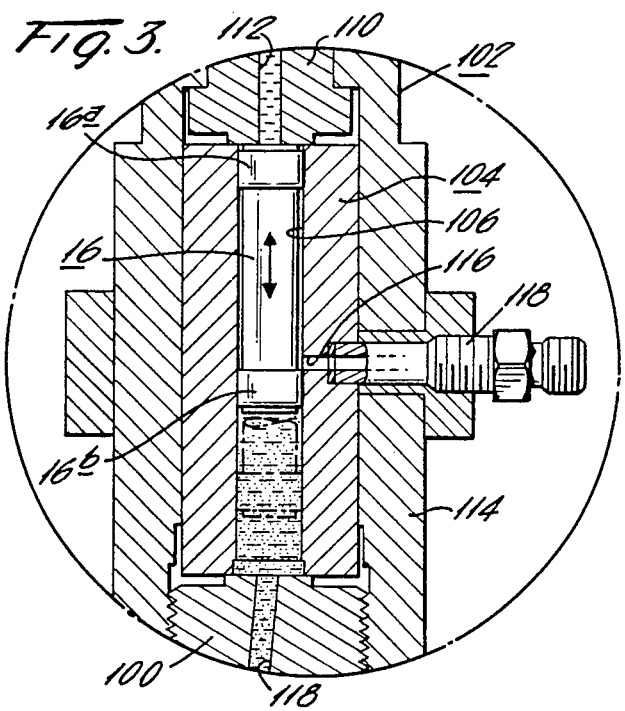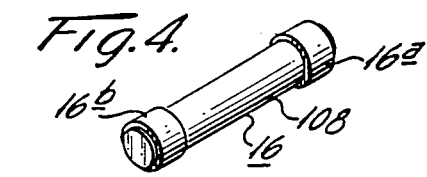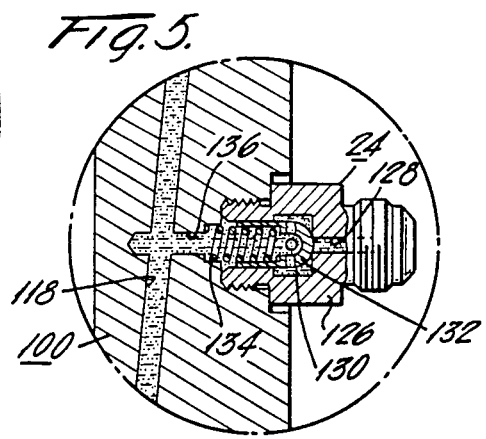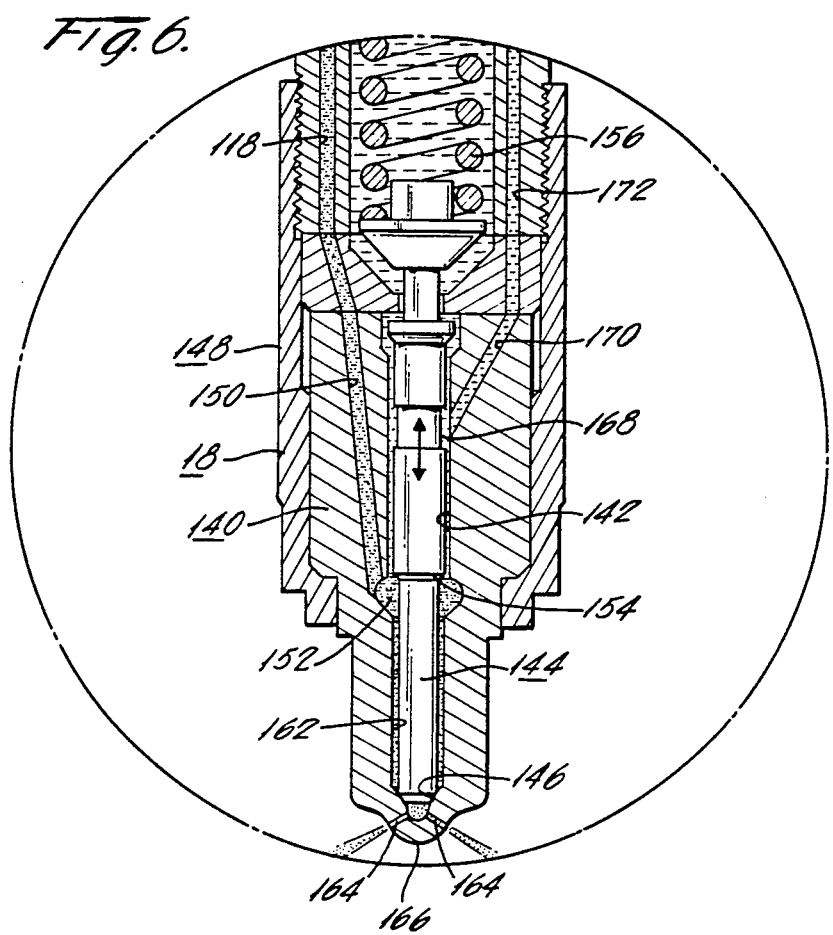

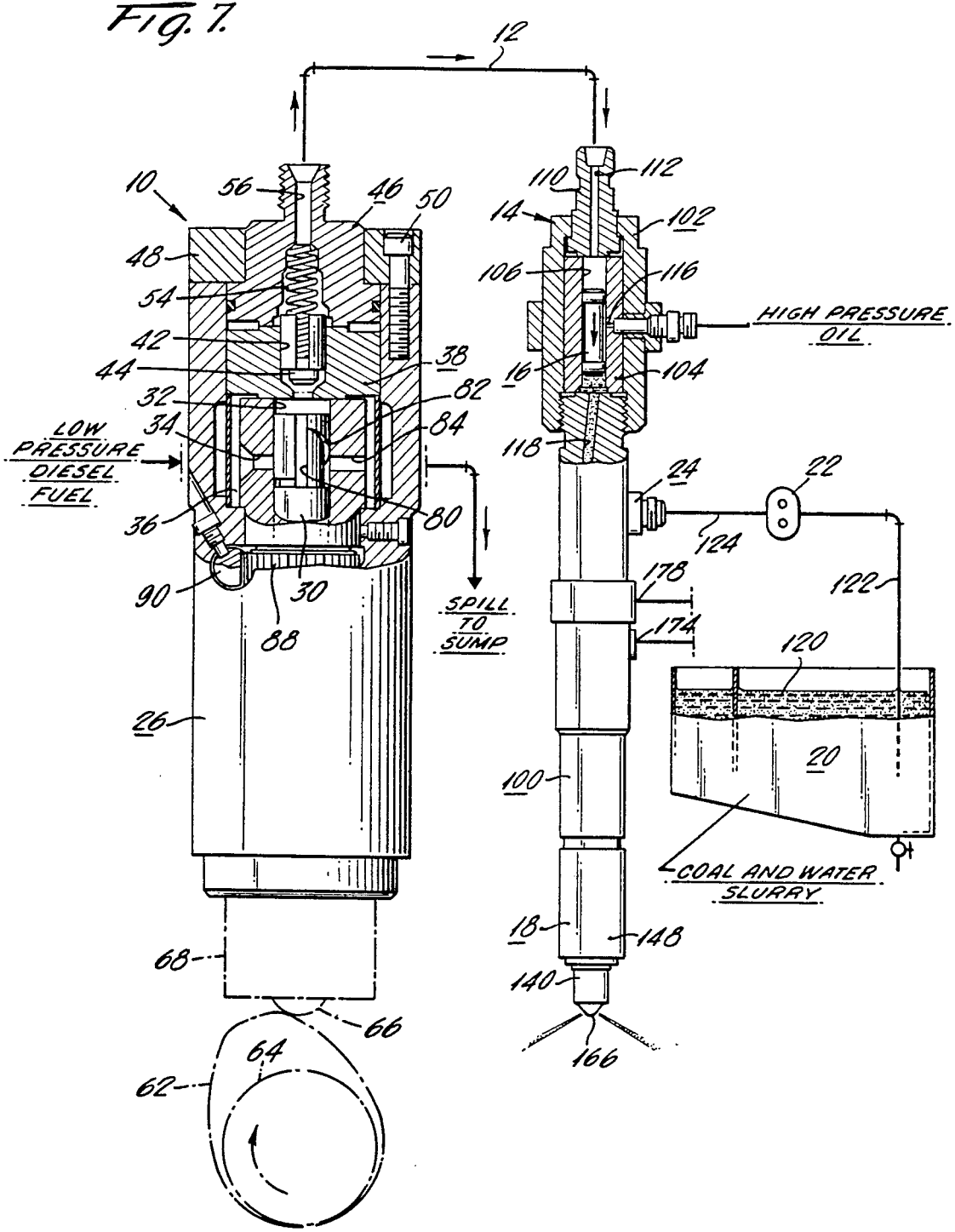

FUEL INJECTION SYSTEM

BACKGROUND OF THE INVENTION

The present invention relates generally to diesel fuel injection systems and relates more particularly to a diesel fuel injection system for use with fuels which are abrasive in nature such as coal-water slurry, and heavy oil fuels.

The use of the above so-called alternate fuels has previously been confined essentially to external combustion applications, such as the heating of boilers in power generation stations or for marine propulsion systems. The use of these alternate fuels in internal combustion engines such as large stationary diesel engines has not heretofore been feasible since the abrasive character of these fuels would be incompatible with the fuel injection system components, particularly the fuel injection pump. These components are precision machined to close tolerances in view of the high fuel pressures generated during the injection intervals. The increasing cost of diesel fuel has, however, resulted in renewed interest in the utilization of such alternate fuels as coal-water slurry and heavy oils in internal combustion engines despite the greater difficulties involved in charging an engine with such fuels.

Mechanical engine driven diesel fuel injection pumps of the reciprocating plunger type, known as jerk pumps, have long been used in diesel engines of a wide range of sizes to produce timed, metered pulses of diesel fuel to nozzles through high pressure injection lines. The injection nozzles are typically spring loaded and open automatically upon delivery of the high pressure pulses from the injection pump to introduce a spray of fuel to an engine cylinder through spray orifices. Such nozzles close sharply to terminate injection when the fuel pressure drops below the valve closing pressure. The present invention takes advantage of the well developed technology of the diesel fuel injection pumps and nozzles and the commercial availability of such equipment in sizes suitable for use with large diesel engines in providing a system suitable for use in the injection of alternate fuels.

SUMMARY OF THE INVENTION

In the present invention, a conventional diesel fuel injection pump having a modified delivery valve, connected with a source of diesel fuel, is utilized in conjunction with an injector assembly having a substantially conventional injection nozzle at the lower end thereof for mounting in an engine cylinder. The injector assembly includes a free piston known as a shuttle or shuttle piston, which is slideably disposed in a cylinder within the injector assembly. One end of the cylinder communicates with the fuel pump by means of an injection line to receive timed pulses of metered diesel fuel therefrom, and the other end communicates by means of an internal passage within the injector assembly with the injection nozzle. The injector passage is filled with the alternate fuel which is maintained under a moderate pressure between injections by a check valve and pump connected to an alternate fuel supply.

The metered and timed pulses of diesel fuel discharged by the fuel pump are transmitted to the injector assembly cylinder and displace the shuttle piston to a degree commensurate with size of the fuel pulse thereby producing an equal pulse of alternate fuel to the injection valve which opens and discharges a spray of alternate fuel into the engine cylinder. At the termination of injection, the pump delivery valve closes, but the bleed passage therein permits the rapid decay of pressure in the injection line, permitting the shuttle piston to return to its starting position under the influence of the alternate fuel pressure maintained by the alternate fuel pump and check valve arrangement.

The present system completely isolates the fuel injection pump from the abrasive alternate fuel and accordingly its service life is equal to that of an equivalent engine running on diesel fuel. The shuttle piston is protected from abrasion wear by the introduction of a high pressure oil to an annulus in the piston, the pressure of the oil being equal to or in excess of that of the system injection pressure. Similarly, high pressure oil is delivered to an annulus of the injection nozzle valve to protect the valve from wear.

It is accordingly a first object of the present invention to provide a fuel injection system for alternate fuels such as coal-water slurry or heavy oil which completely isolates the fuel injection pump from the alternate fuel.

Another object of the invention is to provide a fuel injection system as described which utilizes a conventional diesel fuel injection pump to control the timing and metering of the alternate fuel injection.

A further object of the invention is to provide a fuel injection system as described which utilizes a substantially conventional injection nozzle for delivery of the pressurized fuel into an engine cylinder.

Still another object of the invention is to provide a fuel injection system as described which is suitable for use with any suitably pumpable fuel.

A still further object of the invention is to provide a fuel injection system as described, the nonconventional components of which are of a relatively simple design and hence can be economically manufactured.

Additional objects and advantages of the invention will be more readily apparent from the following description of a preferred embodiment thereof.

DESCRIPTION OF THE DRAWINGS

FIG. 1 is a partly schematic sectional elevational view showing a fuel injection system in accordance with the present invention with the injection pump thereof in the fill position;

FIG. 2 is an enlarged view of the designated portion of the fuel pump delivery valve circled in broken lines in FIG. 1;

FIG. 3 is an enlarged view of the injector shuttle piston assembly circled in broken lines in FIG. 1;

FIG. 4 is a perspective view of the shuttle piston;

FIG. 5 is an enlarged view of the designated portion of the injector circled in broken lines in FIG. 1 showing details of the coal-water slurry check valve;

FIG. 6 is an enlarged view of the designated portion of the injector circled in broken lines in FIG. 1 showing details of the injection nozzle; and FIG. 7 is a view similar to FIG. 1 but with the injection pump in the fuel pumping position.

DESCRIPTION OF THE PREFERRED EMBODIMENT

Referring to the drawings, and particularly FIG. 1 thereof, a fuel injection system is illustrated for supplying a diesel engine with timed, metered injections of a coal-water slurry or other alternate fuel. The system in brief comprises a diesel fuel injection pump 10 of substantially conventional construction which delivers timed and metered high pressure pulses of diesel fuel through an injection line 12 to an injector assembly 14. A shuttle piston 16 transfers the diesel fuel pulses to a coal-water slurry filling passages within the injector assembly 14. A fuel injection nozzle assembly 18 at the lower end of the injector assembly extends into the combustion chamber of an engine cylinder (not shown) for delivery of the coal-water slurry as a fine spray in timed relation to the engine cycle. Means are provided for replenishing the coal-water slurry after each injection, said means comprising a supply tank 20 connected to a slurry pump 22 for delivery of the slurry to the injector assembly through a check valve 24. A bleed passage in the pump delivery valve permits the shuttle piston to return to its raised position under the influence of the slurry pressure between injection intervals.

A pump 10 and injector 14 are required for each cylinder of the engine. For large diesel engines, as is the case with the illustrated embodiment, the pump 10 is driven directly by an engine camshaft. In smaller sized engines, a series of pumps may be incorporated in a single pump housing having an integral pump camshaft which is gear driven by the engine.

With the above general description of the injection system in mind, the details of the system components can be considered. The injection pump 10 except for the mentioned bleed hole in the delivery valve, is of essentially conventional construction. The pump includes a pump housing 26 having mounting flanges at the lower end thereof (not shown) for bolting the pump to an engine. A barrel 28 having a plunger 30 slideably disposed therein is supported within the housing 26. The upper end of the barrel above the plunger 30 defines a pumping chamber 32 into which diesel fuel is introduced through inlet port 34 from a fuel sump 36 when the plunger 30 is in the fill position illustrated, diesel fuel being supplied to the fuel sump 36 from a tank by a low pressure fuel pump (not shown). The pumping chamber 32 is closed at its upper end by a retraction type delivery valve assembly 38 which includes a delivery valve holder 40 having a central bore 42 within which the delivery valve 44 is slideably disposed. A delivery valve retainer 46 closes the upper end of the housing and is secured in place by collar 48 and screws 50.

The lower end of the delivery valve 44 engages a valve seat 52 and is biased thereagainst by the delivery valve spring 54 between injection intervals. When the delivery valve is lifted from the valve seat during the injection interval, diesel fuel flows from the pumping chamber 32 through the delivery valve holder bore 42 and out through an outlet passage 56 in the retainer 46 into the injection line 12. A bleed passage 58 in the injection valve permits a backflow of diesel fuel from the injection line 12 into the pump, allowing the pressure in the injection line 12 and the passages 42 and 56 to drop to the low pump fuel supply pressure between injections and thus permit the return of the shuttle piston 16 to its raised starting position due to the pressure differential at opposite ends of the shuttle piston.

The plunger 30 is reciprocated in timed relation to the engine cylinder cycle by connection at its lower end to a tappet assembly 60 which engages the cam 62 of an engine camshaft 64. The tappet assembly 60 includes a roller 66 rotatably supported by a tappet shell 68, the upper end of which engages a plunger guide cup 70 against which the lower end 72 of the plunger is seated. A plunger return spring 74 extends between upper and lower spring seats 76 and 78 and maintains the lower end of the plunger 72, the guide cup 70 and the tappet assembly 60 in engagement and further maintains the engagement of the tappet roller 66 with the cam 62. With a four cycle engine, the camshaft 64 will rotate at one-half engine speed and the timing of the start of the injection as well as the rate of injection will be governed by the shape and angular disposition of the cam 62.

Since the plunger stroke is necessarily constant, being cam driven, fuel metering is effected by varying the injection cut off. A slot 80 in the upper end of the plunger communicates with the pumping chamber 32 and with a relieved section of the plunger beneath a helical edge 82, which edge is positioned to interact with the spill port 84. By selective rotation of the plunger to vary the point of intersection of the spill port with the helical edge 82, the fuel delivery can be accurately metered.

The means for selectively rotating the plunger 30 comprises a control sleeve 86 slideably disposed around the lower end of the barrel 28 and having a gear segment 88 at the upper end thereof engaged with a control rack 90 which passes externally of the housing and is connected to the engine governor. At its lower end, the control sleeve 86 includes slots 92 which receive plunger flanges 94, the flanges 94 sliding within the slots 92 as the plunger reciprocates. Movement of the control rack 90 will effect rotation of the guide sleeve 86 which in turn, through the interaction of the slots 92 and flanges 94 of the plunger, provides a rotation of the plunger commensurate with the position of the control rack.

Rotation of the plunger to align the slot 80 with the spill port 84 will result in no fuel delivery. A counter-clockwise rotation of the plunger will increase the fuel delivery up to a maximum delivery position. The position of the plunger shown in FIG. 1 will produce a normal fuel delivery. As indicated, fuel passing through the spill port is drained to the fuel sump. There is virtually no consumption of diesel fuel with the present system.

The injector assembly 14 includes an injector body 100 which supports the shuttle piston assembly 102 at its upper end and the injection nozzle 18 at its lower end. The injector body 100 includes mounting means (not shown) for attachment of the injector to an engine cylinder with the tip of the injection nozzle extending into the cylinder combustion chamber to inject a spray of coal-water slurry thereinto.

The shuttle piston assembly 102 as shown in FIGS. 1 and in more detail in the enlarged view of FIG. 3 comprises a cylinder 104 having a central bore 106 therein within which the shuttle piston 16 is slideably disposed. As shown in FIG. 4, the shuttle piston 16 is centrally relieved to form an annulus 108 and accordingly bears against the bore 106 along the upper and lower spaced cylindrical surfaces 16a and 16b. The surfaces 16a and 16b and the bore 106 are precision machined to extremely close tolerances, the clearance between these sliding surfaces being approximately 100 millionths of an inch in the preferred embodiment.

The cylinder 104 is seated on the upper end of the injector body 100 and is closed at its upper end by cap member 110 having inlet port 112 passing centrally therethrough. Retainer 114 is threadedly engaged at its lower end to the upper end of the injector body 100 to clamp the cap member 110 and barrel 104 to the injector body 100. The injection line 12, schematically illustrated in FIG. 1, is secured to the upper end of the cap member 110 in fluid communication with the inlet passage 112 and hence the shuttle piston bore 106.

In order to prevent the coal slurry from migrating past the shuttle piston 16, high pressure oil is maintained under high pressure within the annulus 108 of the shuttle piston between the bearing portions 16a and 16b thereof. For this purpose, a high pressure oil inlet 116 is provided in the cylinder 104 at a location which is always in communication with the annulus 108 of the shuttle piston 16. The inlet 116 is connected by means of threaded fitting 118 to a high pressure source of oil, preferably SAE #40 weight oil pressurized from approximately 0 to 2,000 psi above the injection pressure.

An internal passage 118 in the injector body 100 leads from the upper end of the body in communication with the bore 106 of the cylinder 104 downwardly to the fuel injection nozzle 18. The passage 118 as well as the passage and pressure chamber of the injection nozzle to be described are filled with coal-water slurry which is maintained at a minimum pressure, preferably approximately 200 psi, by the pump 22 and the check valve 24. The coal of the slurry is finely powdered, preferably with a nominal powder size range of 3-8 microns. The coal and water slurry 120 from the supply tank 20 passes through the conduit 122 into the pump 22 and thence through conduit 124 into the check valve 24. As shown in the enlarged view of FIG. 5, the check valve 24 comprises a valve body 126 threadedly mounted into the side of the injector body 100. An inlet bore 128 in the check valve body 126 communicates with a chamber 130 within which the check valve element 132 is slideably disposed. A spring 134 urges the valve element toward the inlet 128 and permits the valve to open with a pressure differential of approximately 30 psi. The chamber 130 communicates by means of passage 136 with the injector body passage 118.

The injection nozzle assembly 118 is essentially of a conventional construction and comprises a valve body 140 having a bore 142 therein which the injection valve 144 is slideably disposed for reciprocating movement toward and away from a valve seat 146 at the lower end of the valve body. The valve body is threadedly secured to the lower end of the injector body by a cap nut 148. The injector body passage 118 communicates with an injector nozzle passage 150 opening into a pressure chamber 152 disposed beneath a shoulder 154 of the valve 144. The valve 144 is biased downwardly against the valve seat 146 by a spring 156 disposed within bore 158 of the valve body 100 and acting against a spring seat 160 disposed on the upper end of the valve 144.

During the injection interval, the increased pressure in the pressure chamber 152 acting on the shoulder 154 of the valve will lift the valve against the force of the spring 156, permitting the slurry to pass along the annular passage 162 around a reduced diameter portion of the valve and past the valve seat 146 into spray orifices 164 at the nozzle tip 166. Upon cut off of injection, the spring 156 will return the valve to the closed position illustrated in FIG. 6.

To avoid the passage of the coal-water slurry between the valve element and the bore 142 above the valve shoulder 154, an annulus 168 is provided in the valve 144 and high pressure oil is introduced through nozzle passage 170 which communicates with nozzle body passage 172 which in turn communicates at port 174 with a source of high pressure oil which may be the same source as supplied to the inlet port 116 for the same purpose with respect to the shuttle piston 16. Any oil from this source which should pass into the slurry will simply enter the engine cylinder with the injection spray and will be burned. Should any oil pass into the spring chamber formed by the bore 158, this will be drained through drain passage 176 in the valve body 100 to an outlet port 178 and thence back to the oil reservoir (not shown).

In operation of the system, low pressure diesel fuel, typically at a pressure of 40 psi is supplied to the fuel sump 36 to maintain the pumping chamber 32 in a filled, pressurized condition whenever the inlet port is opened to the sump by the lowered position of the plunger such as shown in FIG. 1. With the plunger essentially at the bottom of its stroke as illustrated in FIG. 1, the fuel flows through the inlet port, filling not only the pumping chamber 32, but also the slot 80 in the plunger and the cut away area below the helix 82. As the plunger moves upwardly with the rotation of the cam 62, the inlet and spill ports are closed by the plunger and diesel fuel at high pressure, typically in the range of 8,000-15,000 psi, is discharged through the delivery valve assembly 38 into the injection line 12, inlet passage 112 and into the bore 106 above the shuttle piston 16, thus serving to move the piston downwardly. This downward movement of the shuttle piston effects a pressurization and displacement of the coal-water slurry beneath the shuttle piston 16 in the bore 106 as well as in the injector body passage 118 and the nozzle passage 115 and the nozzle pressure chamber 152, causing the valve 144 to lift from its seat 146 resulting in a spray of slurry through the orifices 16 into the engine cylinder.

During the injection interval, the check valve 24 is held closed by the pressure in the passage 136 acting against the check valve element 132 and closing the passage 128. Also during the injection interval, the high pressure oil directed into the shuttle piston annulus 108 and the injection valve annulus 168, which oil is at a pressure equal to or greater than the injection pressure, prevents the slurry from entering between either the shuttle piston 16 and its bore 106 or the injection valve 144 and its bore 142. This high pressure oil also prevents the diesel fuel from the injection line 12 from passing the shuttle piston. As indicated, any passage of high pressure oil into either the diesel fuel or the slurry will be minimal and of no consequence.

The injection ends as shown in FIG. 7 when the fuel pump plunger helix 82 passes and opens the spill port 84, thus permitting the delivery valve 44 to return to its seat 52. Although the pump plunger 30 continues its stroke, the fuel displaced passes back to the sump through the spill port.

With the termination of fuel pumping and the closure of the delivery valve, the pressure of the coal-water slurry in the injector and injection nozzle drops, permitting the injection nozzle valve 144 to seat, terminating injection. The diesel fuel pressure in the injection line 12 will drop rapidly to the low pump supply pressure due to the presence of the bleed passage 58 in the delivery valve 44, thus permitting the shuttle piston 16 to move upwardly rapidly to its starting position shown in FIG. 3 under the influence of the pressurized coal-water slurry passing from the pump 22 through the check valve 24 which opens at the end of fuel injection. The shuttle piston 16 is then in position for its next injection stroke.

Although the stroke of the pump plunger 30 is constant as determined by the displacement of the cam 62, the stroke of the shuttle piston 16 will vary depending upon the length of injection. At one extreme, at a control rack position producing no fuel delivery, the pump plunger will still travel through its full stroke, whereas the shuttle piston will not move. At the other extreme, at full fuel delivery the pump plunger stroke remains the same, and the shuttle piston will travel through its maximum downward displacement. For the normal fuel delivery setting of the pump plunger shown in FIG. 1, the shuttle piston will be displaced to the position shown in broken lines in FIG. 3.

As mentioned above, although the preferred embodiment has been described in conjunction with the pumping of a coal-water slurry, it should be understood that other suitably pumpable alternate fuels such as the heavy fuels, including Bunker C oil, used in marine and stationary diesels can also be employed with the present system to avoid the wear which such fuels cause in conventional diesel pumps. The present system completely isolates the injection pump with its close tolerances to the deleterious effects of the abrasive alternate fuels. Furthermore, the provision of the high pressure oil annuli in both the shuttle piston and the injection valve bearing surfaces effectively prevents the intrusion of particulates into these sensitive regions.

Although the fuel injection pump has been described as operating with diesel fuel, which typically would be Number 2 Diesel Fuel, it could also be operated with other fluids such as light oil, hydraulic fluid, etc.

The injection nozzle shown and described is of the inwardly opening type with a plurality of spray orifices. Other types of nozzles also may be suitably used, such as the outwardly opening poppet type nozzle which on opening provides an annular spray orifice.

In some instances, when the retraction volume of the delivery valve is not needed to reduce injection line pressure, it may be possible to eliminate the pump delivery valve entirely instead of providing a bleed hole in the delivery valve. This would depend upon the characteristics of the particular pump and installation. In the preferred embodiment described, a bleed hole typically of 0.020" diameter was found satisfactory.

Manifestly, changes in details of construction can be effected by those skilled in the art without departing from the invention.

I claim:

1. A fuel injection system for alternate fuels such as coal-water slurry, heavy oils and the like, comprising;
    a diesel fuel injection pump for delivering timed and metered pulses of diesel fuel at injection intervals,
    an injector assembly,
    a cylinder within said injector assembly having first and second ends,
    a free shuttle piston slideably disposed within said cylinder,
    an injection line connecting said fuel injection pump to said first end of said cylinder,
    an injection nozzle on said injector assembly,
    passage means in said injector assembly connecting said injection nozzle with said second end of said cylinder,
    means for delivering an alternate fuel into said passage means and maintaining said fuel at a minimum pressure level therein between injection intervals,
    said injection nozzle comprising a normally closed spring-loaded nozzle valve adapted to open when said alternate fuel reaches a predetermined pressure,
    and means for lowering the pressure in said first end of said cylinder between injection intervals to a pressure lower than said alternate fuel minimum pressure level,
    the timed and metered pulses of diesel fuel producing commensurate timed and metered pulses of alternate fuel within said passage means and injection nozzle by movement of said shuttle piston, thereby opening said nozzle to produce a spray of alternate fuel therefrom.

2. The invention as claimed in claim 1, wherein said fuel injection pump comprises a delivery valve, and wherein said means for lowering the pressure in said first end of said cylinder between injection intervals comprises a bleed passage in said delivery valve for allowing diesel fuel to pass back into said pump from said injection line.

3. The invention as claimed in claim 1, wherein said means for delivering alternate fuel into said passage means and maintaining said fuel at a minimum pressure level therein between injection intervals comprises a check valve connected with said passage means, and a pump in communication with said check valve and connected with a supply of alternate fuel.

4. The invention as claimed in claim 1, including means for preventing leakage past said shuttle piston, said means comprising an annulus in said shuttle piston, and means for maintaining pressurized oil in said annulus at a pressure exceeding the pump injection pressure.

5. An injector assembly for use in the injection of alternate fuels such as coal-water slurry, heavy oils and the like, said injector assembly comprising;
    an injector body,
    an injection nozzle on one end of said injector body,
    a cylinder in said injector body
    a shuttle piston slideably disposed in said cylinder,
    a first passage in said injector body connecting one end of said cylinder with said injection nozzle,
    a second passage in said injector body connecting the other end of said cylinder to an outlet port adapted for connection to the injection line of a fuel injection pump,
    an alternate fuel inlet passage in said injector body connecting said first passage with an alternate fuel inlet port in said injector body,
    said injection nozzle comprising a normally closed spring-loaded nozzle valve adapted to open when said alternate fuel reaches a predetermined pressure,
    and a check valve associated with said alternate fuel inlet passage preventing alternate fuel flow outwardly through said alternate fuel inlet port.

6. The invention as claimed in claim 5, including means for preventing leakage past said shuttle piston, said means comprising an annulus in said shuttle piston, and passage means in said cylinder for introducing and maintaining pressurized oil in said annulus.

* * * * *